(12) United States Patent
Wang

(10) Patent No.: US 7,076,598 B2
(45) Date of Patent: Jul. 11, 2006

(54) PIPELINE ACCESSING METHOD TO A LARGE BLOCK MEMORY

(75) Inventor: Chih-Hung Wang, Yunlin Hsien (TW)

(73) Assignee: Solid State System Co., Ltd., Hsinchu (TW)

( * ) Notice: Subject to any disclaimer, the term of this patent is extended or adjusted under 35 U.S.C. 154(b) by 267 days.

(21) Appl. No.: 10/605,099

(22) Filed: Sep. 9, 2003

(65) Prior Publication Data

US 2005/0055493 A1    Mar. 10, 2005

(51) Int. Cl.
*G06F 12/00* (2006.01)
(52) U.S. Cl. .................... 711/103; 365/185.33
(58) Field of Classification Search ........ 711/103–105, 711/113–146
See application file for complete search history.

(56) References Cited

U.S. PATENT DOCUMENTS 5,701,516 A * 12/1997 Cheng et al. ................ 710/22
6,317,371 B1 * 11/2001 Katayama et al. .......... 365/200
6,405,279 B1 * 6/2002 Kondo et al. ............... 711/103
6,684,289 B1 * 1/2004 Gonzalez et al. ........... 711/103
6,871,257 B1 * 3/2005 Conley et al. .............. 711/103
6,907,497 B1 * 6/2005 Hosono et al. ............. 711/103

* cited by examiner

*Primary Examiner*—Donald Sparks
*Assistant Examiner*—Hashem Farrokh
(74) *Attorney, Agent, or Firm*—Jiang Chyun IP Office

(57) ABSTRACT

A pipeline accessing method to a large block memory is described. The large block flash memory has a plurality of pages and each page has a plurality of sectors. The memory device has a controller to control an access operation between a host and a cell array of the large block flash memory with a page buffer. The controller includes at least two buffers, when the host intends to program the memory device. In the method, data sectors are transferred between the host and the large block flash memory by alternatively using the buffers. After transferring N data sectors with respect to one page, a start program command is issued by the controller for programming the data.

6 Claims, 8 Drawing Sheets

| Page 0 | LBA 0+extra info; LBA 1+extra info; LBA 2+extra info; LBA 3+extra info |
| Page 1 | LBA 4+extra info; LBA 5+extra info; LBA 6+extra info; LBA 7+extra info |
| ... | 210 |
| Page 63 | LBA 252+extra info; LBA 253+extra info; LBA 254+extra info; LBA 255+extra info |

Large block flash memory

FIG. 5 (PRIOR ART)

PIPELINE ACCESSING METHOD TO A LARGE BLOCK MEMORY

BACKGROUND OF INVENTION

1. Field of Invention

The present invention relates to access operation for a large block flash memory. More particularly, the present invention relates to an access operation on a large block flash memory by a pipeline manner.

2. Description of Related Art

Nonvolatile memory chips, which include nonvolatile memory arrays, have various applications for storing digital information. One such application is capable of storing a large amount of digital information used by digital cameras, as replacements for hard disk within a personal computer (PC) and so forth. Nonvolatile memory arrays are comprised of various types of memory cells, such as NOR, NAND and other types of structures known to those of ordinary skill in the art. One of the characteristics of nonvolatile memory is that the stored information still remains while power is disconnected or disrupted.

FIG. 1 is a block diagram, schematically illustrating architecture of flash memory card. In FIG. 1, the host end 90 can access data stored in a flash disk 100, in which the flash disk (memory device) 100 includes a controller 102 and a flash memory array 104. The flash memory array 104 may include one or more memory chips. In access operation, the host end 90 usually accesses the data in the flash memory array 104 via the controller 102 at the requested address. In addition to communicating with the host, the controller 102 also takes responsibility of managing the flash memory array 104 via the accessing interface 106. The flash memory storage device 100 is then configured as a drive by the host.

FIG. 2 is a mapping architecture maintained by the control unit. The host side, such as a drive, includes a plurality of logical blocks at the logical space 110, each of which blocks can be addressed by the host. Namely, the host can access all the logical space 110, including logical block 0, logical block 1, . . . , and logical block M−1. Also and the physical space 112 is used to store the actual information. The structure is conventional and can be understood by the skilled artisans.

A flash memory device generally is divided into a plurality of storage units, such as blocks which include page or more pages. As shown in FIG. 2, the physical space 112 of the flash memory device includes physical block 0, physical block1, . . . , and physical block N−1. The logical space 110 used by the host is always less than the physical space 112 because some of the physical blocks may be defective or used by the controller 102 for managing the flash memory module. One task of the controller 102 is to create the logical space 110 for host access. Indeed, the host 90 can not directly address the physical space 112, so that the controller 102 must maintain the mapping relations between the logical blocks and the physical blocks. Such a mapping information is always called as a mapping table and can be stored in the specific physical blocks or loaded into the SRAM within the controller. If a host 90 asks for accessing a particular logical block, the controller 102 then looks up the mapping table for identifying which physical block to be accessed.

FIG. 3 is a drawing, schematically illustrating the block structure of a conventional small block flash memory. A physical block X 114 includes 32 pages(sectors) for storing the host data of logical sector LBA0~31 and their accompanying extra information.

FIG. 4 is a block diagram, schematically illustrating the conventional controller. There are two independent SRAM buffers 204 and 206 serving as the bank 0 and bank 1, for data transfer. Wen one bank is transferring data with the host 202 other bank can also transfer data with the flash memory array through the flash interface unit. A pipeline operation is used. The access operation is usually divided into three stages. The stage 1 represents that data is transferring between the host and the controller. Stage 2 represents that a calculation about which page (sector) to be written. Stage 3 represents that data is transferring between the controller and the flash memory, wherein a start program command, such as "10H" is conventionally also issued to the flash memory. Since there are two buffers 204 and 206 in the controller, they are alternatively used under the design of a pipeline manner. However, once the start program command is sent, the flash memory needs a long busy time, about 200 μs, to finish programming operation.

FIG. 5 is a drawing, schematically illustrating the block structure of large block flash memory. Because one page size is 2K+64 Bytes, there are four sectors (528 bytes*4) within one page for storing four logical sectors (512 bytes*4) and their extra information (16 bytes*4), such as error check code (ECC) etc.

When the conventional access operation is applied to the large block flash memory, one page needs four operations with respect to four sectors in transferring data. Since each time of the start program command consumes about 200 microseconds to actually program the flash memory. The operation speed is rather slow. In order to speed up the operation to program the large block flash memory, it needs a novel access manner.

SUMMARY OF INVENTION

The invention provides a method for accessing a large block flash memory, which has multiple sectors. The data is not programmed to the large block flash memory by a sector unit. In the invention, when data of the whole page with multiple sectors has been received at a buffering region of the large block flash memory, a start program command is issued to actually program the memory cell array. As a result, the frequency to issue the start program command is reduced in the large block flash memory. The busy time caused by the start program command can be reduced.

The invention also provides a method for programming the large block flash memory of the memory device by a pipeline design. A data cache region and a page buffer are used in the large block flash memory. Data from the controller to the memory cell array is first stored in the data cache region. When the data of one page is completely received by the cache data, the data is shift to the page buffer. In this manner, the data cache can continuously receive data of the next page from the controller. At same time, the data in the pager buffer can be actually programmed into the memory cell array.

As embodied and broadly described herein, the invention provides an accessing method to a large block flash memory is described. The large block flash memory has a plurality of pages and each page has a plurality of sectors. The memory device has a controller to control an access operation between a host and a large block memory of the memory device with a page buffer. The controller includes at least two buffers, when the host intends to program the memory device. In the method, data sectors are transferred between the host and the large block flash memory by alternatively using the buffers. After transferring N data sectors with respect to one page, a start program command is issued by the controller for programming the memory cell array. Wherein the data transferring operation is using a pipeline manner and is divided into three stages. At least two of the three stages can be performed at the same time. Wherein the memory device has two page buffers, which are also arranged into a pipeline to receive the pages in faster operation speed.

The invention also provides a programming method on a large block flash memory of a memory device, wherein the large block flash memory has a data cache region and a page buffer region. The method comprises receiving a first data to the data cache; shifting the first data to the page buffer; programming the first data into the memory cell array; and receiving a second data to the data cache when the step of programming the first data is not complete yet.

The invention also provides a method of accessing a large block flash memory, wherein the large block flash memory has a plurality of pages and each page has a plurality of sectors. The memory device has a controller to control an access operation between a host and a large block flash memory of the memory device. The controller also has two buffers regions. The method comprises transferring a portion of a current page data from the host to the controller, and transferring a portion of the current page data from the controller to the data cache, wherein the two transferring steps can be performed at the same time. The current page data in the data cache is then shifted to the page buffer. And, the current page data is programmed into the memory cell array, and simultaneously the foregoing two transferring steps are performed if a next page data is desired to continuously transfer.

In the foregoing method, the two transferring steps and the programming step are performed at the same time for a time period.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is a drawing, schematically illustrating the block structure of large block flash memory.

DETAILED DESCRIPTION

The present invention is directed to an accessing method to the large block flash memory. The features include that the data is not programmed to the large block flash memory by a sector unit. Instead in the invention, when data of the whole page with multiple sectors has been received at a buffering region of the large block flash memory, a start program command is issued to actually program the memory cell array. As a result, the frequency to issue the start program command is reduced in the large block flash memory. The busy time caused by the start program command can be reduced.

The invention also provides a method for programming the memory cell array of the large block flash memory by a pipeline design. A data cache region and a page buffer are used in the large block flash memory. Data from the controller to the memory cell array is first stored in the cache data region. When the data of one page is completely received by the cache data, the data is shift to the page buffer. In this manner, the data cache can continuously receive data of the next page from the controller. At same time, the data in the pager buffer can be actually programmed into the memory cell array.

Examples are provided for descriptions of the invention as follows but the invention is not limited to the example.

As previously mentioned, when the host intends to access, for example, program the memory cell array in the large block flash memory, the data in block unit is transferred via the controller. However, since one page in the large block flash memory has multiple sectors, such as four sectors, four data bocks from the host are organized as a page by the controller to be stored in the large block flash memory.

Figure 6:
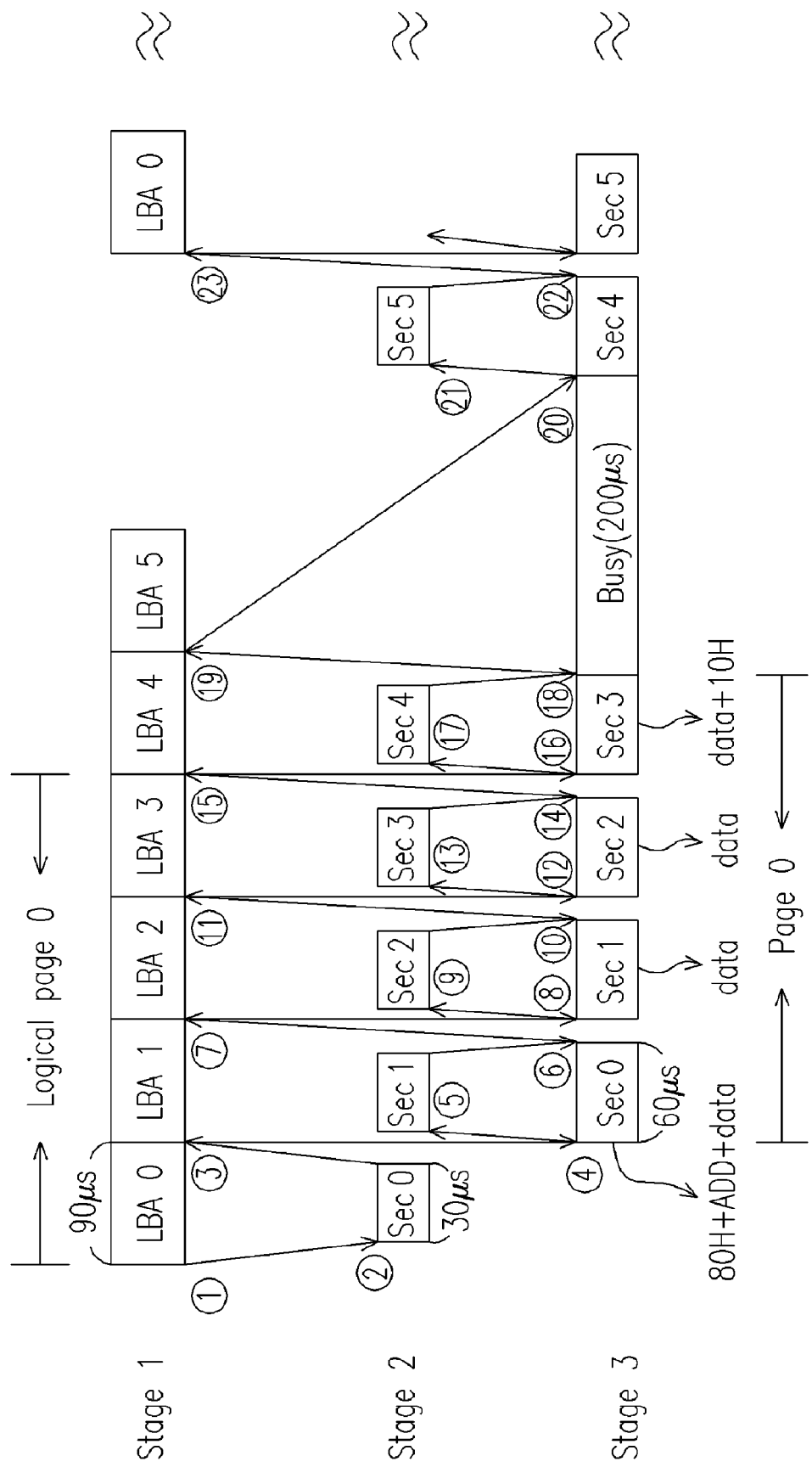
FIG. 6 is a drawing, schematically illustrating an accessing method to the large block flash memory in sequence, according to an embodiment of the invention.

FIG. 6 is a drawing, schematically illustrating an accessing method to the large block flash memory in sequence, according to an embodiment of the invention. In FIG. 6, a sequence of data blocks, such as LBA0, LBA1, ..., LBA5, from the host are to be programmed into the page of the large block flash memory. Data transferred from the host to the large block flash memory usually needs three stages. In a basic definition in the specification, stage 1 means that data transfer between the host and the controller. Stage 2 means that the controller calculates address for which page (sector) to be written. Stage 3 means that data transfer between the controller and the flash memory, wherein a start program command, such as "10H" is usually issued to the flash memory. When the start program command is issued it needs a long busy time, such as 200 micro seconds to finish programming operation to the memory cell array. The flash memory typically also has a buffer region to temporarily store the data from the controller. The start program command activates the programming action from the buffer region to the memory cell array.

Figure 1:
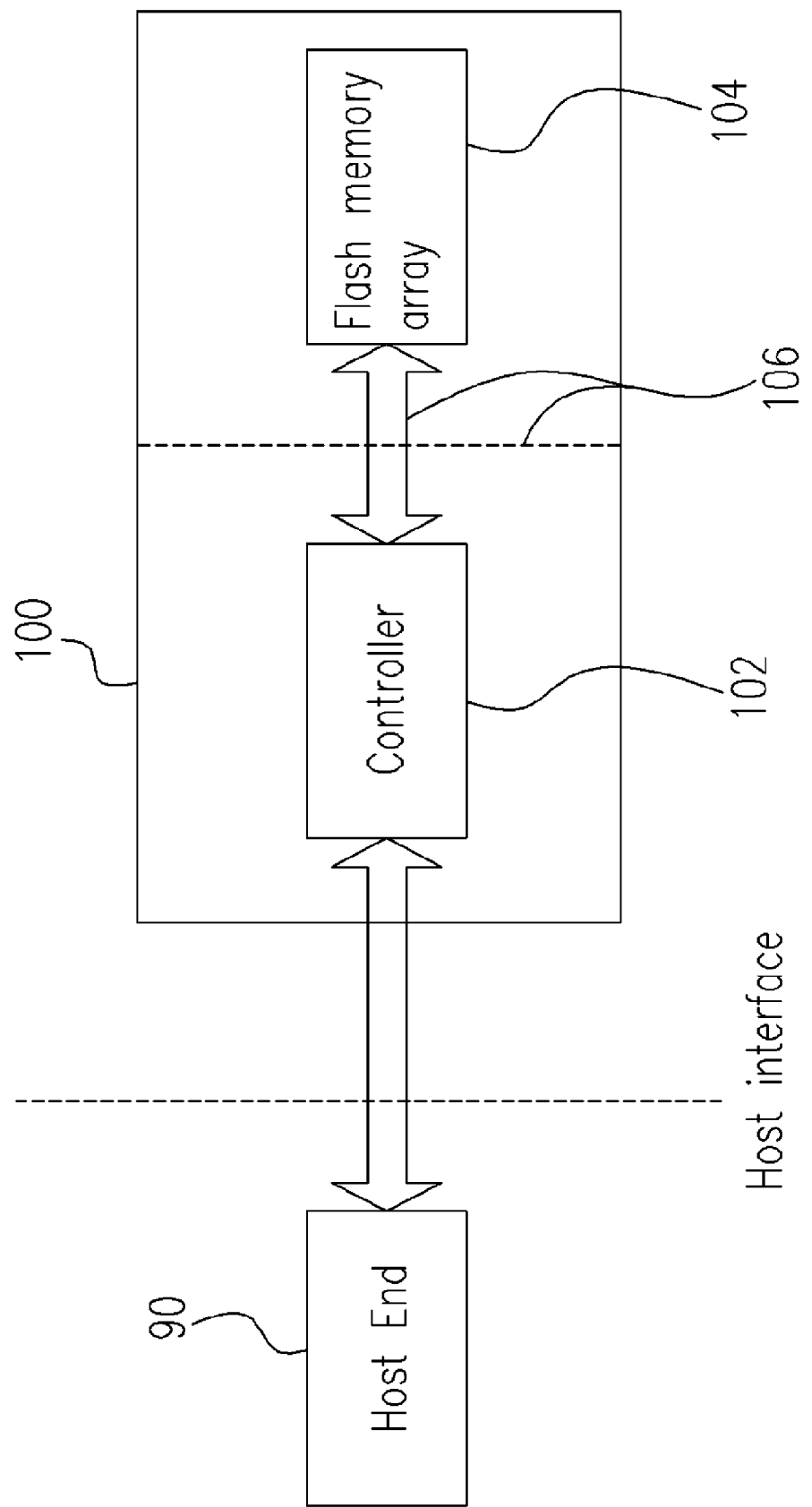
FIG. 1 is a block diagram, schematically illustrating architecture of flash memory card.
Figure 2:
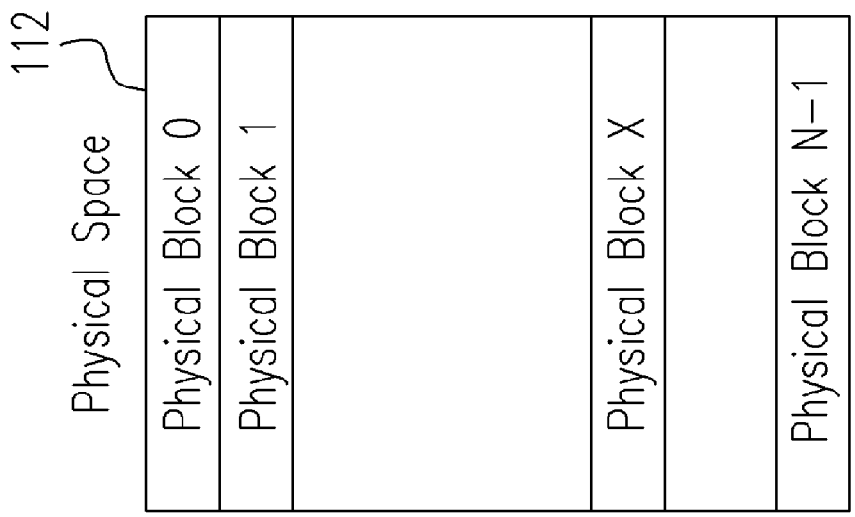
FIG. 2 is a mapping architecture maintained by the control unit.
Figure 2:
Figure 2:
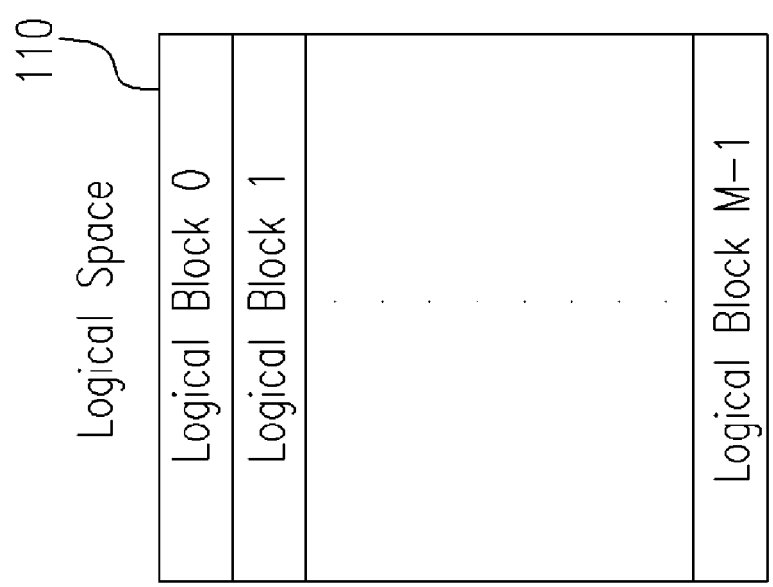
Figure 3:
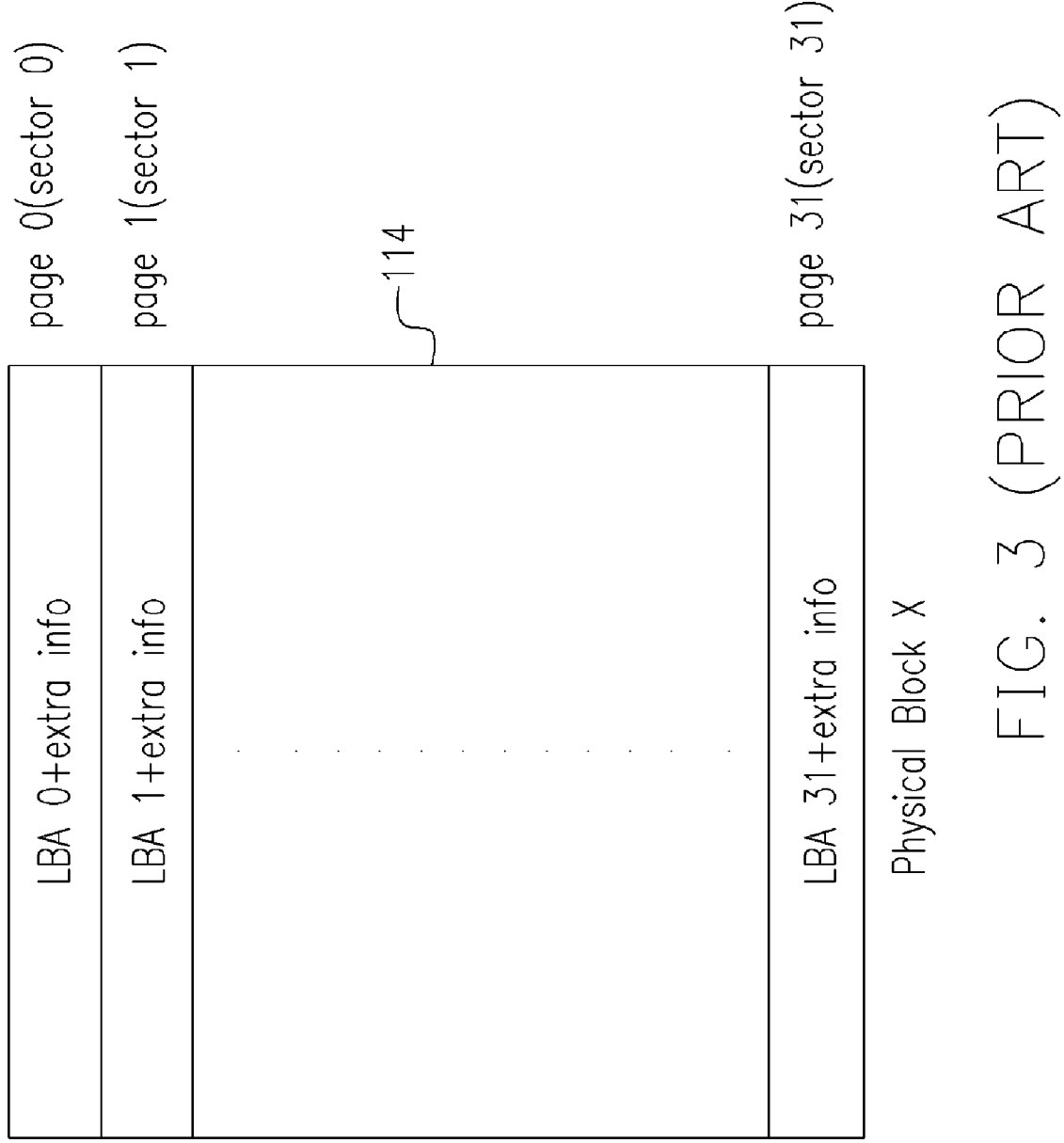
FIG. 3 is a drawing, schematically illustrating the block structure of a conventional small block flash memory.
Figure 4:
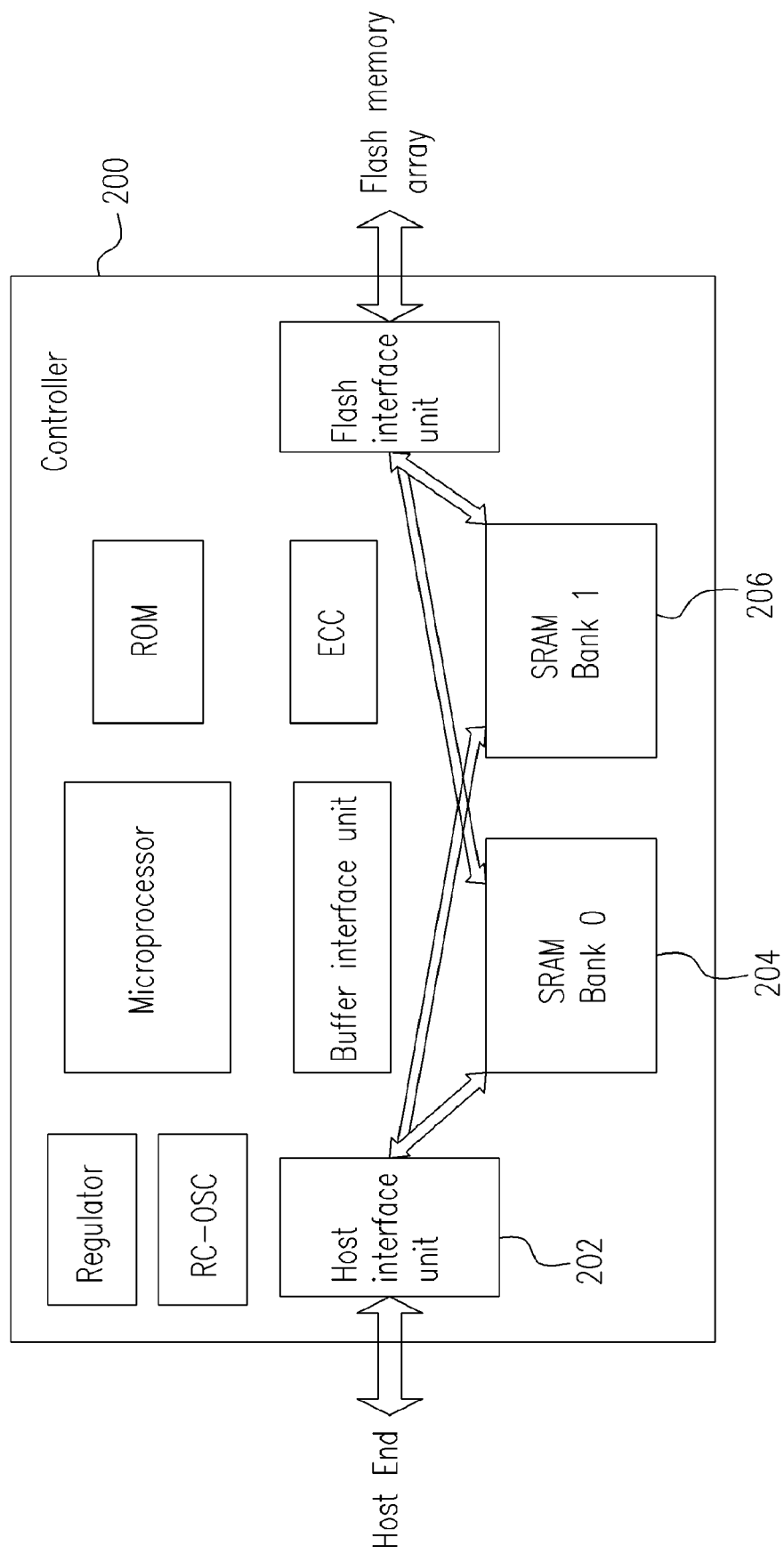
FIG. 4 is a block diagram, schematically illustrating the conventional controller.

Also referring to FIG. 4, at state (1), the controller 200 asks the host to start transferring data and uses one of two banks (i.e. SRAM bank0) as a data buffer for LBA0. After calculating the page 0(sector 0) address at (2), the controller check whether LBA0 data transfer is finished at (3). Until LBA0 data transfer is done, the controller asks the host to transfer the next one logical sector, LBA 1. The SRAM bank1 is then used as a data buffer for LBA1. Then, at (4), the controller starts transferring sector 0 data (LBA0 data i.e.

512 bytes+extra information, i.e, 16 bytes) in bank0 into flash memory. During data transfer to flash memory, at (5), the controller can calculate the physical address for the sector 1.

Since the invention is to program the large block flash memory, which has multiple sectors in one page, it should be noted in the invention that the start program command "10H" is not immediately issued after the sector 0 is transferred to the flash memory. Instead in the invention, the next three data blocks are continuously transferred to have a complete one page, then the command "10H" at (18) is issued. As a result, four sectors, sector0 sector3, are programmed simultaneously. It takes only about 200 microseconds to program four sectors. Thereby, the controller reduces 3 times programming time (200 us*3) and enhances system performance.

Another feature of this invention in the foregoing operation is that when parts of one page data are transferring between the host and the controller, parts of the same page data can also be transferred into flash memory at the same time. Also and, before sending the last sector of one page to the flash memory, a part of sectors within the next page start transferring data from the host to the controller. When one page is programming into flash memory cell array, the other page remains transferring between the host and the controller. In this pipeline arrangement of the invention, the operation speed can be improved.

Figure 7:
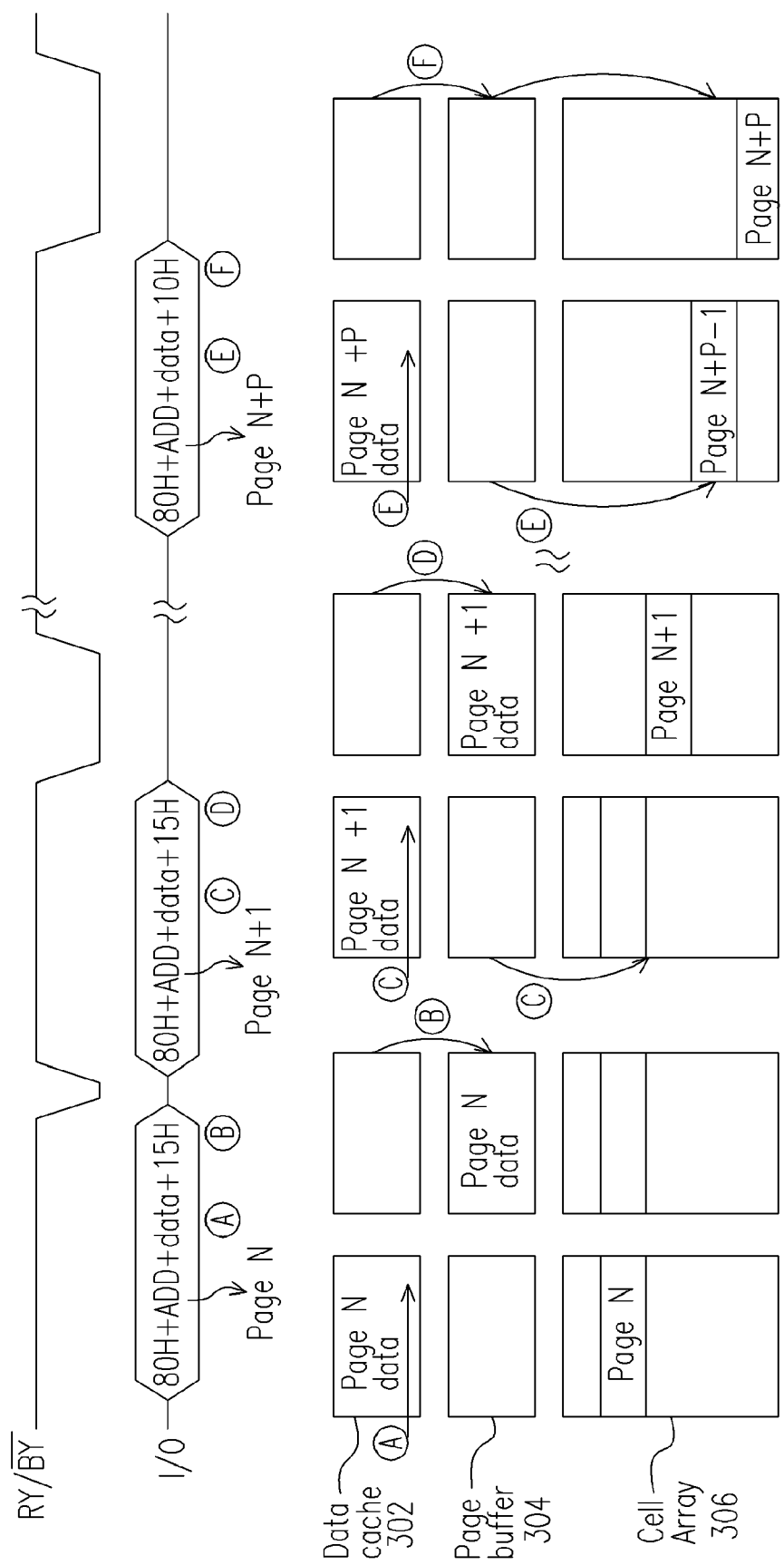
FIG. 7 is a drawing, schematically illustrating a programming method to memory cell array of the large block flash memory in sequence, according to an embodiment of the invention.

As previously described, when the data are transferred to the large block flash memory, the data usually are not directly programmed into the memory cell array but stored at a buffer region. In order to further improve the operation speed, the invention also designs the programming method under the pipeline design. FIG. 7 is a drawing, schematically illustrating a programming method to memory cell array 306 of the large block flash memory in sequence, according to an embodiment of the invention. In FIG. 7, the large block flash memory is taken as the example for description and includes a data cache 302 and a pager buffer 304 to temporarily store the data from the controller. At (A), the data is input into the data cache 302 within large block flash memory. After sending a command "15H" instead of "10H", at (B), the page N data in data cache 302 are shifted into the page buffer 304. When the next page, age N+1, is still transferring at (C), the page N is simultaneously programming into the memory cell array 306. At (D), the behavior is the same as (B). If the page N+P is the last page to be programmed, the controller then sends a "10H" command. At (F), after receiving 10H command, the flash memory moves the page N+P data from data cache 302 to the page buffer 304, and then starts programming. The feature of this function is that when the next page data is transferring into the data cache 302 within flash memory, the current page 304 is programming into flash memory cell array 306. Thereby, the whole system programming performance is enhanced.

Figure 8:
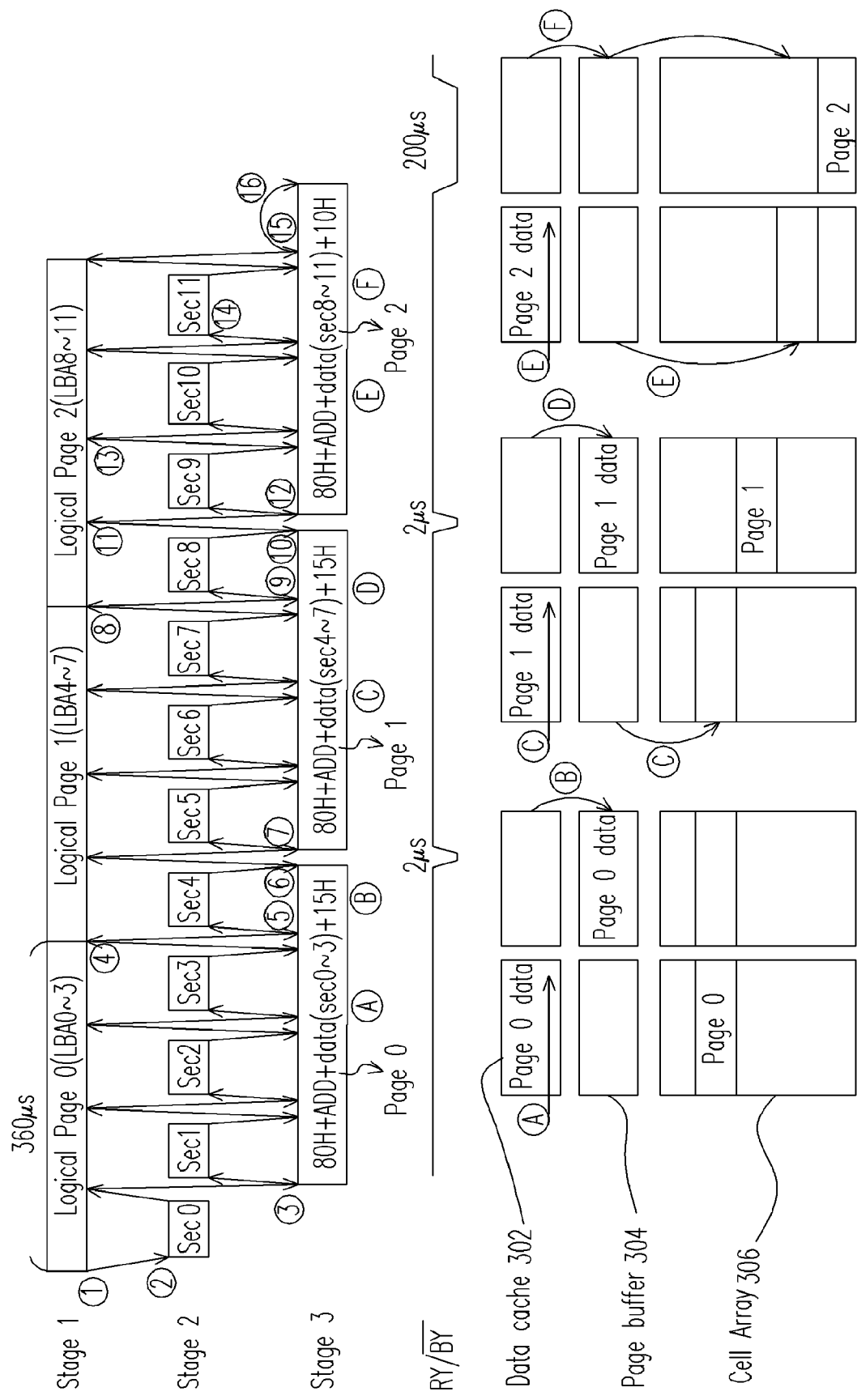
FIG. 8 is a drawing, schematically illustrating another programming method to memory cell array of the large block flash memory in sequence, according to an embodiment of the invention.

However, for the large block flash memory, this pipeline design in FIG. 7 can be combined with the mechanism shown in FIG. 6. FIG. 8 is a drawing, schematically illustrating another programming method to memory cell array of the large block flash memory in sequence, according to an embodiment of the invention. In FIG. 8, four sectors as a page are sequentially sending between the host and the controller as well as between the controller and the flash memory. After, i.e., the page 0 data is completely received at the data cache 302, the command "15H" is issued at (B) instead of the command "10H" in FIG. 6. Here, the command "15H" in function with the start program command "10H" is also called as a "staxt program with data cache" command. Then, the data in data cache is shifted to the page buffer 304. At (C), when parts of one page data are transferring between the host and the controller, parts of the same page data are moving into the data cache 302 within flash memory. At the same time, the previous one page stored in the page buffer 304 is programming into the memory cell array 306. At (D), after the controller sends the 15H command to flash memory, the page 1 data is moving from the data cache to page buffer. At the same time, the controller still can be receiving page 2 data from the host. Therefore, the busy time between two pages is, for example, about 2 microseconds but not the 200 microseconds (see RY/BY signal). When the last page is received, the "10H" command can be issued at (F).

By using the data cache 302 and the page buffer 304, the "15H" command is used instead of the "10H" command to have the pipeline design, the programming time can further reduced. In the operation, the invention allows three operations to be performed at the same time. In other words, at least two or all of the operation of transferring data from the host to the controller, the operation of transferring data form the controller to the data cache 302, and the operation of programming data from the page buffer 304 to the memory cell array 306 can be performed at the same time at certain time period.

It will be apparent to those skilled in the art that various modifications and variations can be made to the structure of the present invention without departing from the scope or spirit of the invention. In view of the foregoing descriptions, it is intended that the present invention covers modifications and variations of this invention provided they fall within the scope of the following claims and their equivalents.

The invention claimed is:

1. A method of accessing a large block memory of a nonvolatile memory device, wherein the large block memory has a plurality of pages and each page has a plurality of sectors, wherein the memory device has a controller to control an access operation between a host and the large block memory of the memory device, the controller also has two buffers regions, the method comprising:

transferring a portion of a current page data from the host to the controller, and transferring a portion of the current page data from die controller to a data cache within the large block memory, wherein the two transferring steps can be performed at the same time;

shifting the current page data in the data cache to a page buffer within the large block memory, when full data of one page is received and a storage space of the page buffer is available; and programming the current page data into a cell array of the large block memory, and simultaneously performing the foregoing two transferring steps if a next page data is desired to continuously transfer.

2. The method of claim 1, wherein in the step of shifting the current page data in the data cache to the page buffer, a command is issued to perform the step.

3. The method of claim 1, wherein in a time period, at least two of the two transferring steps and the programming step are performed at the same time.

4. The method of claim 1, wherein in a time period, all of the two transferring steps and the programming step are performed at the same time.

5. The method of claim 1, wherein when a last page is received, a start program command is issued to program the memory cell array.

6. A method of accessing a large block memory of a nonvolatile memory device, wherein the large block memory has a plurality of pages and each page has a plurality of sectors, wherein the memory device has a controller to control an access operation between a host and the large block memory of the memory device, the controller also has two buffers regions, the method comprising:

transferring a portion of a current page data from the host to the controller, and transferring a portion of the current page data from the controller to a data cache within the large block memory, wherein the two transferring stens can be performed at the same time;

shifting the current page data in the data cache to a page buffer within the large block memory;

programming the current page data into a cell array of the large block memory, and simultaneously performing the foregoing two transferring steps if a next page data is desired to continuously transfer; wherein before a last page is received, a "start program with data cache" command is issued for simultaneously receiving the data at the data cache and programming the data at page buffer into the cell array of the large block memory.

* * * * *